(12) United States Patent
Vrchota

(10) Patent No.: US 10,685,564 B1
(45) Date of Patent: Jun. 16, 2020

(54) REDUCING PAVER MAT VARIATION DURING SUPPLY MACHINE INTERFACE

(71) Applicant: Caterpillar Paving Products Inc., Brooklyn Park, MN (US)

(72) Inventor: Zachary J. Vrchota, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/269,093

(22) Filed: Feb. 6, 2019

(51) Int. Cl.
  *G08G 1/09* (2006.01)
  *G08G 1/0967* (2006.01)
  *E01C 19/00* (2006.01)
  *E01C 19/10* (2006.01)

(52) U.S. Cl.
  CPC ..... *G08G 1/096733* (2013.01); *E01C 19/004* (2013.01); *E01C 19/1063* (2013.01)

(58) Field of Classification Search
  CPC .............................. G06Q 50/28; G06K 17/00
  USPC .............. 340/905, 907, 995, 988, 540, 541, 340/539.12, 539.32; 106/271, 274, 106/277–279
  See application file for complete search history.

(56) References Cited

U.S. PATENT DOCUMENTS

| | | | |
|---|---|---|---|
| 5,549,412 A | 8/1996 | Malone | |
| 5,921,708 A * | 7/1999 | Grundl | E01C 19/48 180/168 |
| 8,099,218 B2 * | 1/2012 | Glee | E01C 19/004 106/271 |
| 8,930,092 B2 | 1/2015 | Minich | |
| 9,011,038 B2 * | 4/2015 | Buschmann | E01C 19/00 404/101 |
| 9,845,578 B2 | 12/2017 | Marsolek et al. | |
| 2008/0292398 A1 * | 11/2008 | Potts | E01C 19/48 404/83 |
| 2013/0189032 A1 * | 7/2013 | Bellerose | E01C 23/065 404/75 |
| 2016/0170415 A1 * | 6/2016 | Zahr | G05D 1/0293 701/23 |
| 2017/0205999 A1 | 7/2017 | Marsolek | |
| 2018/0142427 A1 | 5/2018 | Tkachenko et al. | |

* cited by examiner

Primary Examiner — Tai T Nguyen
(74) Attorney, Agent, or Firm — Schwegman, Lundberg & Woessner

(57) ABSTRACT

A system for controlling the interface between a paving machine and material supply machine. The system includes a sensor or other means for sensing a distance between the paving machine and the material supply machine and a control system in operable communication with the sensor or other means for sensing and in operable communication with either or both of an operational system of the paving machine and an operational system of the material supply machine to take control of the acceleration or deceleration of either or both of the paving machine and material supply machine.

20 Claims, 6 Drawing Sheets

REDUCING PAVER MAT VARIATION DURING SUPPLY MACHINE INTERFACE

TECHNICAL FIELD

The present disclosure generally relates to automatic control processes in machines and, more particularly, relates to automatic control processes for use on paving machines and/or material supply machines or trucks interfacing with the paving machines to control the interface between the paving machines and supply machines or trucks to reduce deviations or defects in the paved mat.

BACKGROUND

Paving machines or pavers are used to apply, spread, and compact a mat of material relatively evenly over a desired base. These machines are regularly used in the construction of roads, parking lots, and other areas where a smooth durable surface is required for cars, trucks, and other vehicles to travel. A paving machine generally includes a hopper for receiving paving material from a supply machine or vehicle, such as a supply truck, and a conveyor system for transferring the paving material rearwardly from the hopper to a screed assembly for discharge onto a roadbed base. The screed assembly smooths and somewhat compacts the paving material and, preferably, leaves a mat of generally uniform depth and smoothness.

When preparing to supply the paving machine hopper with material from the supply truck (or other supply machine), a truck operator backs the supply truck up so that it is just short of the paving machine. The paving machine is permitted to interface with the supply truck, making contact therewith. After the paving machine contacts with the supply truck, the truck operator may raise the supply truck bed to deliver material to the paving machine hopper. The paving machine pushes the supply truck forward as the supply truck delivers the material to the hopper. It is generally desirable that the paving machine keep as consistent a speed as possible throughout the paving process. During the interfacing process between the paving machine and the supply truck, when the paving machine and supply truck contact, however, the impact can cause the screed to shift around and create an inconsistency, discontinuity, or other deviation or detect in the paving mat. The deviation or defect might not be able to be rolled out, in which case it could be aesthetically unappealing and/or decrease ride quality of the paved mat.

Generally, a lot of manual communication between the paving machine operator, truck operator, and potentially ground crew is required to manage the interface between the supply truck and the paving machine. Some paving machines include hydraulic cylinders or other dampening devices to cushion the impact to help reduce the effect of a bump to the paving machine during the interfacing contact with the supply truck. However, such dampening devices require expensive hydraulics or the like.

U.S. Published Patent Application No. 2018/0142427 discloses an apparatus for controlling the movement of a material transfer vehicle with respect to the front end of a paving machine that is being supplied by the material transfer vehicle. The apparatus includes a controller that is mounted on the material transfer vehicle for controlling the steering and speed of the material transfer vehicle. A sensor, mounted on the material transfer vehicle and operatively connected to the controller, is located and adapted to execute multiple non-contact sensor scan passes across the front end of the paving machine to determine the distance from the sensor to the paving machine. The sensor is also adapted to communicate information to the controller about the distance from the sensor to the paving machine. The apparatus includes no components that are mounted on the paving machine. U.S. Published Patent Application No. 2018/0142427 does not address controlling contact between a paving machine and a material supply machine or vehicle, such as a supply truck, to reduce deviations or defects in the paved mat.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key or critical elements of all embodiments, nor delineate the scope of any or all embodiments.

The present disclosure, in one or more embodiments, relates to a system for controlling the interface between a paving machine and material supply machine. The system includes a sensor or other means for sensing a distance between the paving machine and the material supply machine and a control system in operable communication with the sensor or other means for sensing and in operable communication with either or both of an operational system of the paving machine and an operational system of the material supply machine to take control of the acceleration or deceleration of either or both of the paving machine and material supply machine. Specifically, the control system controls a relative speed between the paving machine and material supply machine as the distance between the paving machine and material supply machine nearly closes such that speeds of the paving machine and material supply machine are nearly matched just prior to contact between the paving machine and material supply machine.

The present disclosure, in one or more embodiments, additionally relates to a similar system for controlling the interface between a paving machine and material supply machine. The system includes a sensor mounted on the paving machine and configured to sense a distance between the paving machine and the material supply machine and a control system installed on the paving machine in operable communication with the sensor. The control system is configured to control the acceleration or deceleration of the paving machine. Specifically, the control system controls the speed of the paving machine as the distance between the paving machine and material supply machine nearly closes such that the speed of the paving machine nearly matches the speed of the material supply machine just prior to contact between the paving machine and material supply machine.

The present disclosure, in one or more embodiments, also relates to a method for controlling the interface between a paving machine and material supply machine. The method includes assessing a distance between the paving machine and the material supply machine, and with a control system in operable communication with an operational system of the paving machine, an operational system of the material supply machine, or both, and configured to receive data relating to the assessed distance, controlling the acceleration or deceleration of the paving machine, material supply machine, or both based on the assessed distance. For example, as the distance between the paving machine and material supply machine is nearly closed (e.g., as the paving machine and material supply machine come close to, or substantially close to, contacting one another), the method includes controlling the acceleration or deceleration of the paving machine, material supply machine, or both with the control system such that speeds of the paving machine and material supply machine are nearly matched (e.g., such that the speeds of the paving machine and material supply machine are close to or almost equal to one another) just prior to contact between the paving machine and material supply machine.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The drawings, which are not necessarily drawn to scale, illustrate generally, by way of example, but not by way of limitation, various embodiments discussed in the present disclosure.

DETAILED DESCRIPTION

The present disclosure relates to automatic control processes for use on paving machines and/or material supply machines or trucks (collectively, referred to herein as material supply machines) interfacing with the paving machines to control the interface between the paving machines and supply machines or trucks to reduce deviations or defects in the paved mat. In general, the present disclosure describes the use of machine-to-machine communication, GPS readings, sensors, and/or other means of determining the distance between the paving machine and material supply machine and/or assessing the speed of, or the relative speed of, the material supply machine and controlling the paving machine, material supply machine, or both to slowly close the gap between the paving machine and the material supply machine, make soft contact between the paving machine and material supply machine, and match the speeds of the paving machine and material supply machine once in contact. Additionally or alternatively, the material supply machine may be controlled to switch into neutral gear substantially immediately prior to or substantially at the time of contact with the paving machine, thereby permitting paving machine to push the material supply machine while interfacing therewith.

Figure 1:
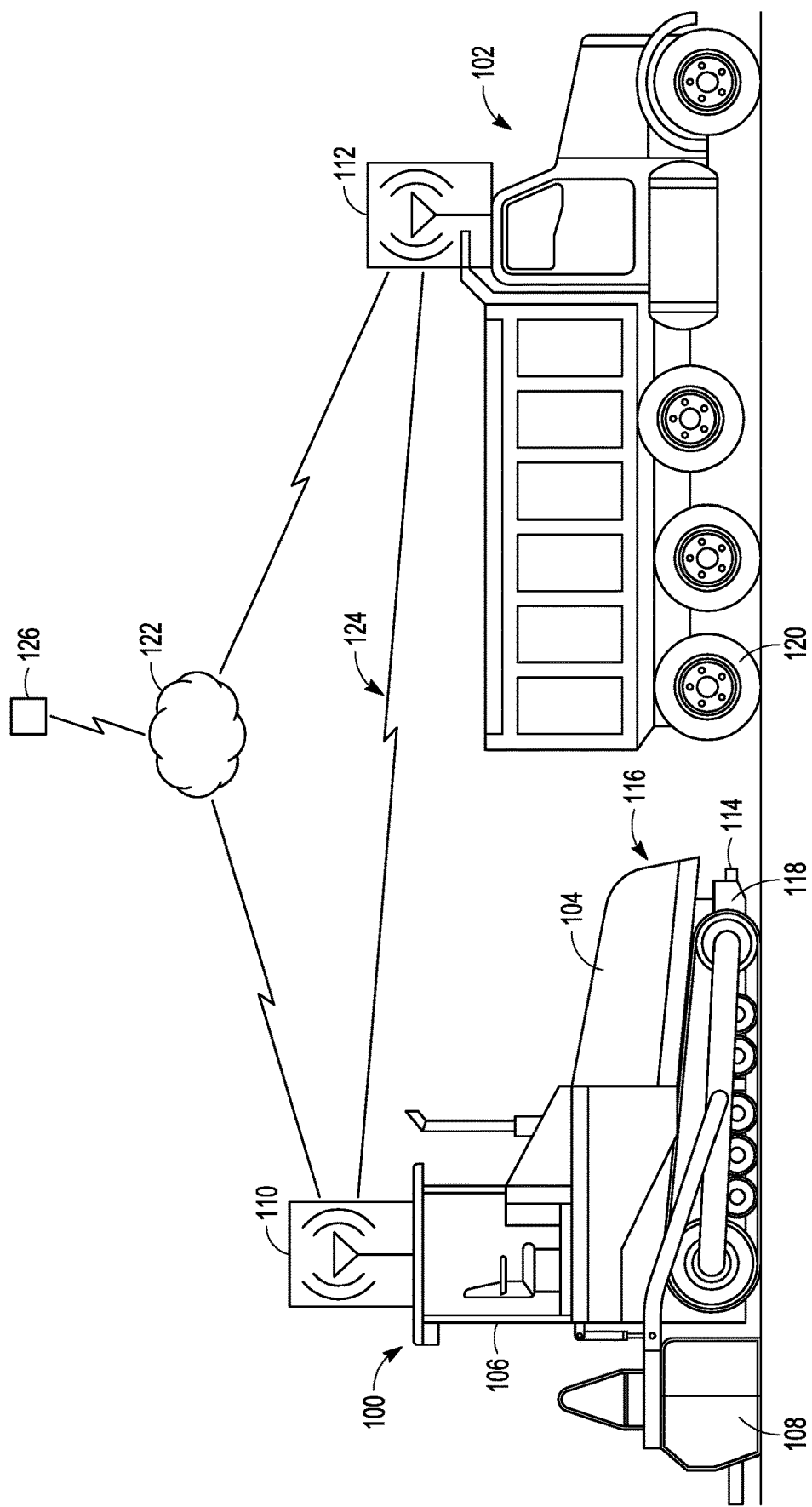
FIG. 1 illustrates a paving machine and material supply machine in accordance with embodiments of the present disclosure during a paving operation, wherein the material supply machine is preparing to supply the paving machine with paving material.

FIG. 1 illustrates a paving machine 100 and material supply machine 102, such as a supply truck, in accordance with embodiments of the present disclosure during a paving operation, wherein the material supply machine is preparing to supply the paving machine with paving material. The paving machine 100 generally includes a hopper 104 for receiving material from the material supply machine 102, an operator cab or position 106, and a screed assembly 108 to which material from the hopper is conveyed for discharge onto a roadbed base.

Figure 2:
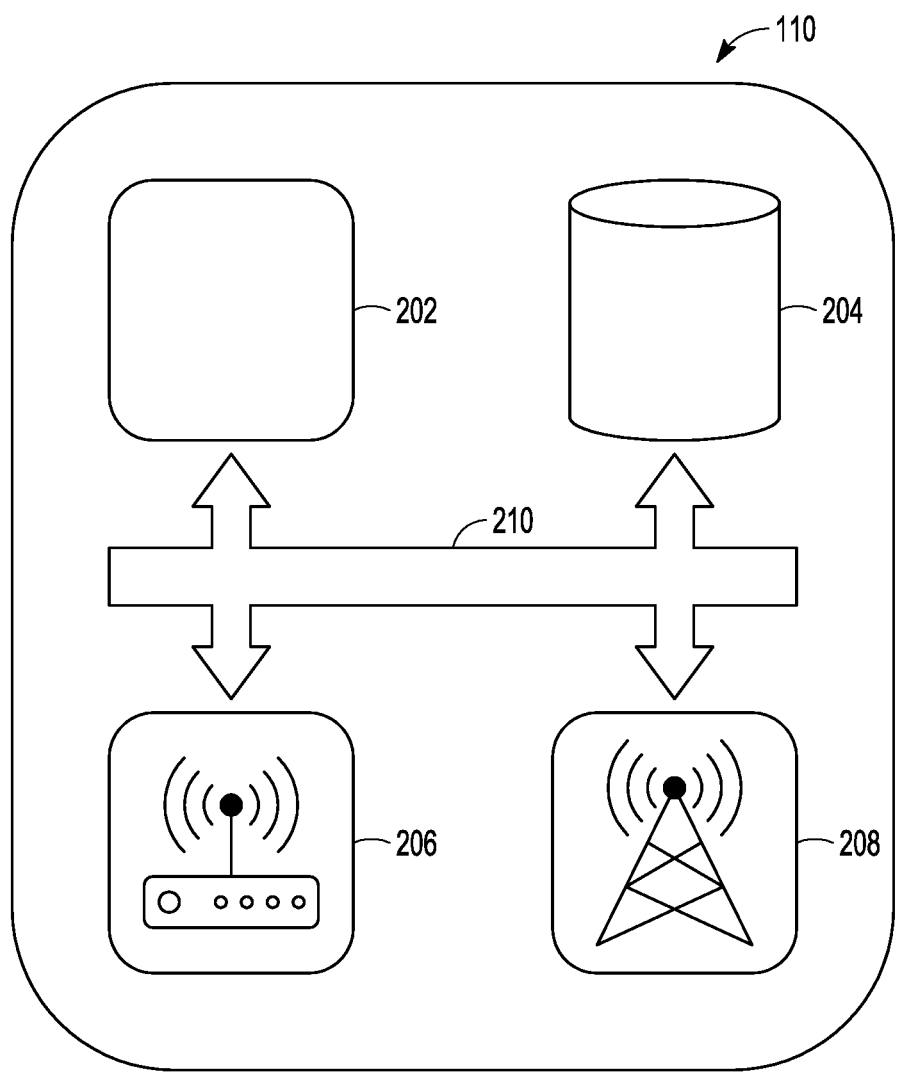
FIG. 2 is a block diagram of a control system in accordance with embodiments of the present disclosure.

Paving machine 100 may also include a control system 110 in operable communication with one or more operational systems of the paving machine. As illustrated in FIG. 2, control system 110 may include a processing resource or processor 202 such as a central processing unit (CPU) or hardware or software control logic and memory 204 in operable communication with the processor and storing computer-executable program code or instructions for execution by the processor, Memory 204 may comprise any computer readable storage medium that can store the computer-executable program code for use by or in connection with the processor 202. Such computer readable storage medium may be, for example but is not limited to, an electronic, magnetic, optical, electromagnetic, infrared, or semiconductor system, apparatus, or device. More specific examples of suitable computer readable storage media include, but are not limited to, a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. The computer-executable program code and data may be transmitted between memory 204 and processor 202 using any appropriate computer readable medium, including but not limited to, an electrical connection having one or more wires, an optical fiber cable, radio frequency (RF) signals or other wireless signals, or other suitable medium. Computer-readable media includes, but is not to be confused with, computer-readable storage media, which is intended to cover all physical, non-transitory, or similar embodiments of computer-readable media.

In some embodiments, control system 110 may also include a communications module 206 and/or a global positioning system (GPS) module 208 in operable connection with the processor 202 and/or memory 204. In some embodiments, control system 110 may include one or more buses 210 operable to transmit communications between the various components, such as the processor 202, memory 204, communications module 206, and GPS module 208. Communications module 206 may be operable to communicate using any one or more suitable communications protocol and with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network 122, such as a local area network (LAN), wide area network (WAN), hotspot, global communications network (e.g., the Internet), or may be via an ad hoc connection or communication between at least two devices, such as ad hoc connection 124 between two control systems.

The various hardware and software components of the control system 110, as discussed herein, may be integral portions of a single unit in operable communication with one or more operational systems of the paving machine 100, may be integral with one or more operational systems of the paving machine, or may be divided among a plurality of systems or locations connected directly or through a network, such as a global computer information network like the Internet. Accordingly, aspects of the various embodiments of the present disclosure can be practiced in distributed computing environments where certain tasks are performed by remote processing devices that are linked through a communications network.

In some embodiments, material supply machine 102 may also include a control system 112, which may optionally be in operable communication with one or more operational systems of the material supply machine. Control system 112 may be similar to, and comprise some or all of the same components as, control system 110 of paving machine 100, illustrated in FIG. 2. As will be described in further detail below, in some embodiments, control systems 110 and 112 are in communication with one another, either directly (e.g., 124) or indirectly, such as via a network 122, utilizing any of the one or more suitable communications protocols described above.

Figure 3:
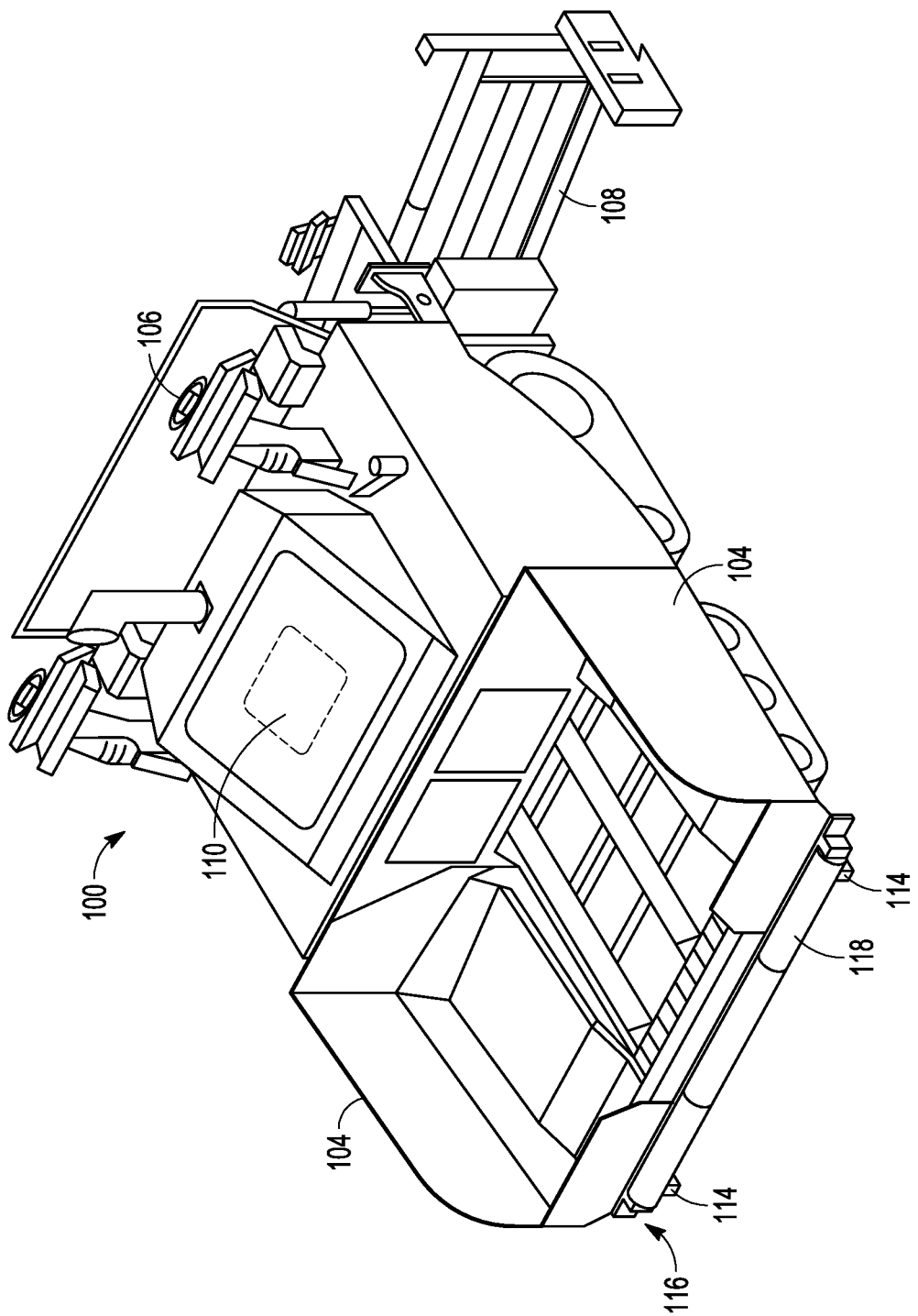
FIG. 3 is an isometric view of a paving machine in accordance with embodiments of the present disclosure.

In some embodiments, as illustrated in FIGS. 1 and 3, paving machine 100 may include one or more sensors 114 in operable communication with paving machine control system 110. Sensor(s) 114 may be operable alone or in connection with control system 110 to sense and/or assess the distance between the paving machine 100 and the material supply machine 102. In some embodiments, sensor(s) 114 may be operable alone or in connection with control system 110 to sense and/or assess the distance between the location where the sensor(s) are mounted, such as a leading or front end of the paving machine 100, such as a leading or front end 116 of the hopper 104 or a push bar or other pushing device 118 of the paving machine, and a rear tire or tires 120 of material supply machine 102. However, sensor(s) 114 may be operable alone or in connection with control system 110 to sense and/or assess the distance between any suitable part of paving machine 100 and any suitable part of material supply machine 102. Alternatively or additionally, sensor(s) 114 may be operable alone or in connection with control system 110 to sense and/or assess the speed of the material supply machine 102 or the relative speed of the material supply machine with respect to the paving machine 100. In one embodiment, the speed of the material supply machine 102 or the relative speed of the material supply machine with respect to the paving machine 100 may be based on the above-described sensed or assessed distance between the paving machine 100 and the material supply machine 102. Sensor(s) 114 is/are any suitable optical or electro-optical, electromagnetic, ultrasonic, or other sensor type conventionally or unconventionally used to sense and/or assess proximity, distance, and/or speed of an object.

Figure 4:
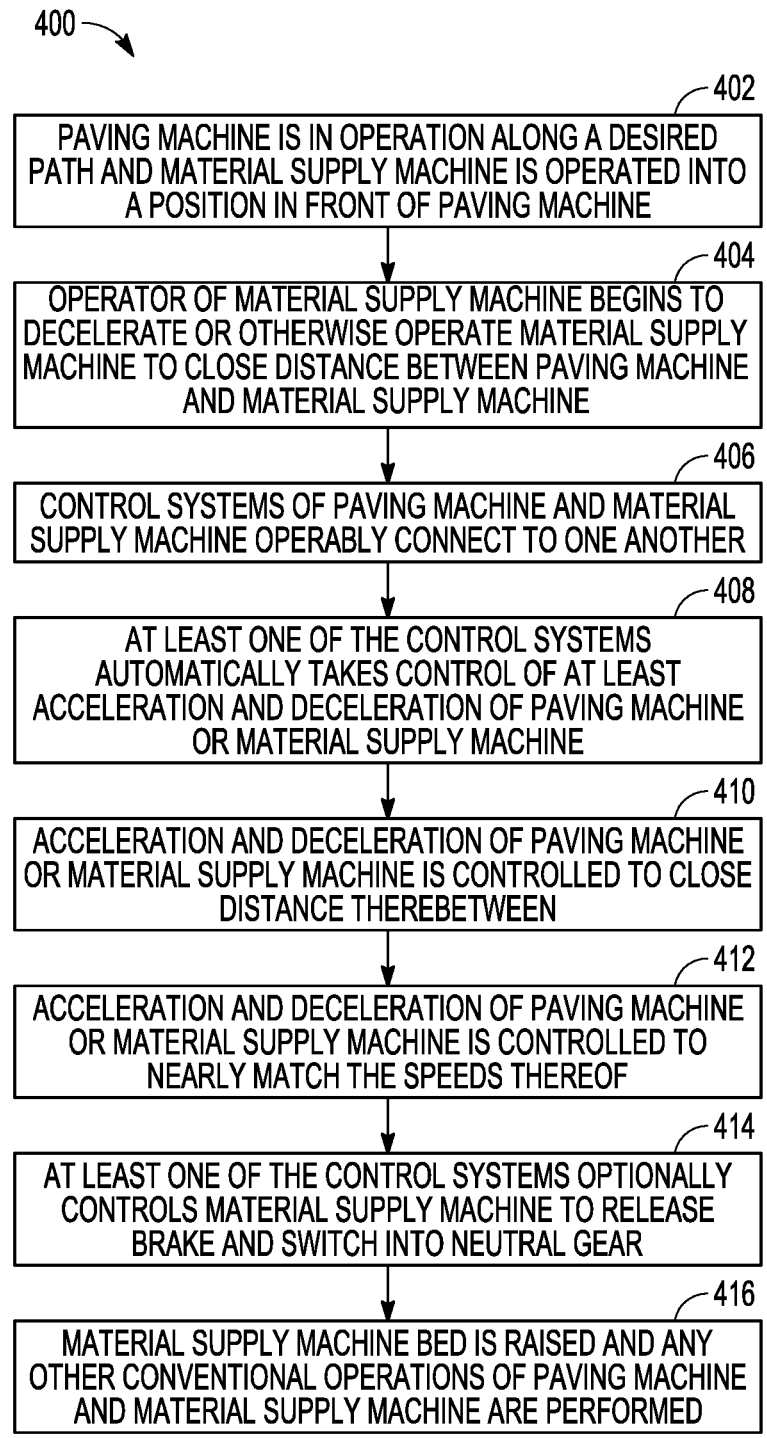
FIG. 4 is a flow diagram for a method for controlling the interface between a paving machine and a material supply machine to reduce deviations or defects in the paved mat in accordance with embodiments of the present disclosure.

A method 400 of one embodiment for controlling the interface between a paving machine 100 and a material supply machine 102 to reduce deviations or defects in the paved mat is illustrated in FIG. 4. In an initial step 402, a paving machine 100 is in operation along a desired path to apply, spread, and compact a mat of material over a desired base, and a material supply machine 102 preparing to supply the paving machine hopper 104 with paving material is operated into a position in front of the paving machine, as illustrated in FIG. 1. At step 404, the operator of the material supply machine 102 begins to decelerate the material supply machine or otherwise operate the material supply machine so as to begin to close the distance between the paving machine 100 and the material supply machine. In other embodiments, the paving machine 100 could additionally or alternatively be accelerated to shorten the distance between the paving machine and the material supply machine. However, it is usually desirable for the paving machine to keep as consistent a speed as possible throughout the paving process.

At step 406, or at any suitable time prior to step 406, the control systems 110, 112 of the paving machine 100 and material supply machine 102 operably connect to one another, through their respective communications modules 206. In one embodiment, the connection between the control systems 110, 112 may be automatic, such as when the paving machine 100 and material supply machine 102 are generally within a certain range of one another, such as but not limited to, within the range typically associated with the communication protocol being used between control systems 110, 112. In other embodiments, the control system 110 of the paving machine 100, the control system 112 of the material supply machine 102, and/or other controller in communication with either or both of the control systems 110, 112 may have a control mechanism for switching either or both of the control systems 110, 112 into a paring mode, or the like, after which the control systems will operably connect to one another, through their respective communications modules 206.

At step 408, when the paving machine 100 and material supply machine 102 are determined to be generally within a certain threshold range of one another, such as but not limited to, within ten feet or less, particularly within five feet or less, or even within between about one to three feet or less, at least one of the control systems 110, 112 of the paving machine 100 and material supply machine 102 automatically takes control of at least the acceleration and deceleration of either the paving machine or material supply machine to further close the distance between the paving machine and material supply machine. In one embodiment, whether the paving machine 100 and material supply machine 102 are within a certain threshold range of one another may be determined by one or both of the control systems 110, 112 using data received from sensor(s) 114. Additionally or alternatively, whether the paving machine 100 and material supply machine 102 are within a certain threshold range of one another may be determined by one or both of the control systems 110, 112 using data received from the GPS modules 208 of the control systems. In still additional embodiments, other conventional or unconventional methods of automatically determining the distance between two objects may be used in addition to, or as an alternative to, using data from sensor(s) 114 and/or GPS modules 208 in order to determine whether the paving machine 100 and material supply machine 102 are within a certain threshold range of one another. In yet another embodiment, rather than at least one of the control systems 110, 112 taking control of either the paving machine 100 or material supply machine 102 automatically when the paving machine and material supply machine are generally within a threshold range of one another, an operator of either the paving machine or material supply machine may, at such operator's discretion, manually operate a switch or other mechanical or digital mechanism that switches control of at least the acceleration and deceleration of either the paving machine or material supply machine over to at least one of the control systems 110, 112.

At step 410, under the control of at least one of the control systems 110, 112, the acceleration and deceleration of either the paving machine 100 or material supply machine 102 is controlled to further close the distance between the paving machine and material supply machine. Because it is usually desirable for the paving machine 100 to keep as consistent a speed as possible throughout the paving process, in one embodiment, the acceleration and deceleration of only the material supply machine 102 is controlled to close the distance between the paving machine and material supply machine. However, in other embodiments, the acceleration and deceleration of only the paving machine 100 may be controlled or the acceleration and deceleration of both the paving machine and the material supply machine 102 may be controlled. At any rate, regardless of whether only one or both of the paving machine 100 and material supply machine 102 are being controlled, the relative speed between the paving machine and material supply machine is controlled or managed so as to slowly close the distance between the paving machine and material supply machine.

In one embodiment, as indicated previously, the distance between the paving machine 100 and material supply machine 102 may refer to the distance between a leading or front end of the paving machine, such as a leading or front end 116 of the hopper 104 or a push bar 118 of the paving machine, and a rear tire or tires 120 of the material supply machine. Of course, in other embodiments, the distance between the paving machine 100 and material supply machine 102 may refer to the distance between any suitable part of paving machine and any suitable part of material supply machine.

Figure 5:
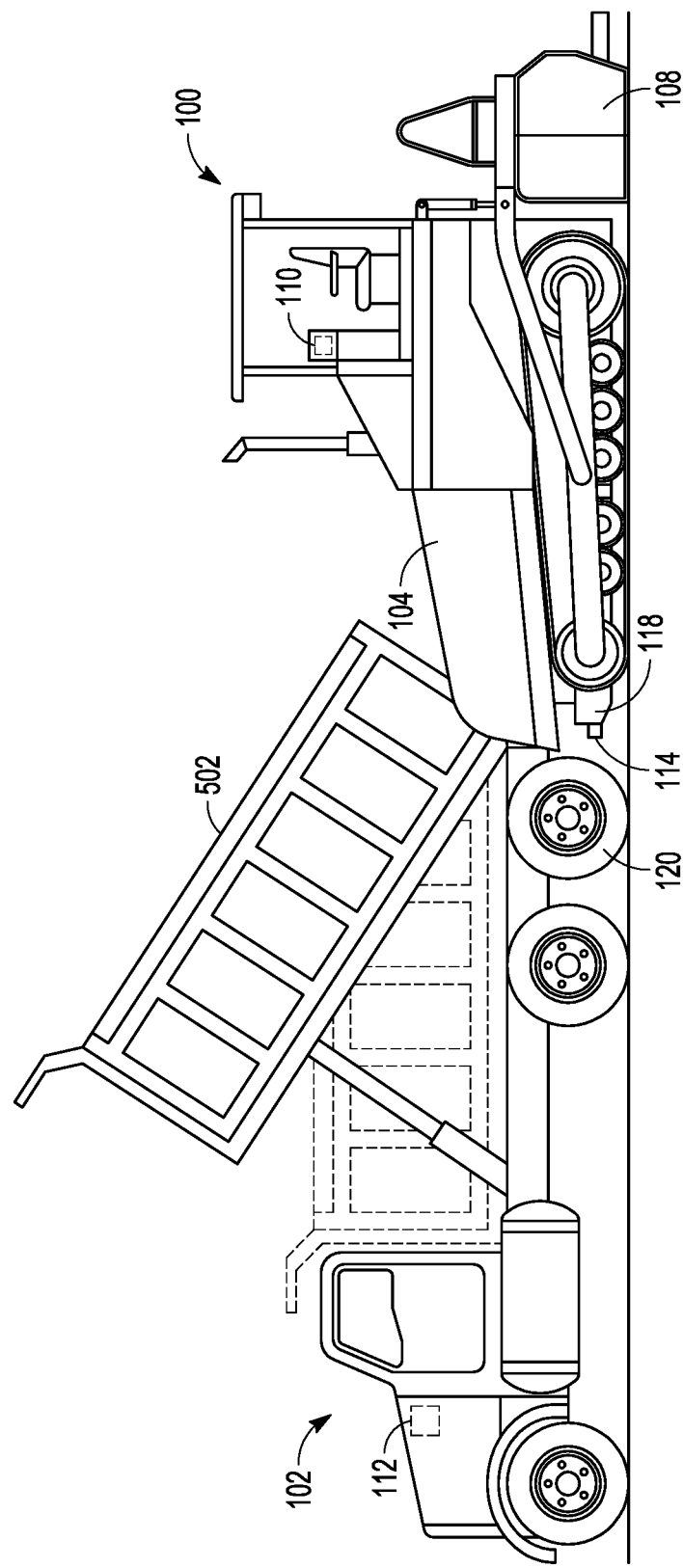
FIG. 5 illustrates a paving machine and material supply machine in accordance with embodiments of the present disclosure during a paving operation, wherein the distance between the paving machine or material supply machine is nearly closed.

At step 412, as the distance between the paving machine 100 or material supply machine 102 is determined by at least one of the control systems 110, 112 to be nearly completely closed, as illustrated in FIG. 5, the acceleration and deceleration of either or both of the paving machine or material supply machine is controlled so as to nearly, but not completely, match the speeds of the paving machine and material supply machine, such that the distance between the paving machine and material supply machine is completely closed at a slow pace so that when the paving machine and material supply machine make contact, any impact between the paving machine and material supply machine is reduced, and is generally softer, as compared to conventional methods of interfacing between the paving machine and material supply machine. The speeds of the paving machine 100 and material supply machine 102 are nearly matched such that the relative speed between the paving machine and material supply machine is, in some embodiments, less than or equal to about three miles per hour, and in other embodiments, less than or equal to about two miles per hour, and in still further embodiments, less than or equal to about one mile per hour. The distance at which the space between the paving machine 100 and material supply machine 102 is considered nearly completely closed may vary depending on the paving operation, but in some embodiments is less than or equal to about twenty feet, in other embodiments, is less than or equal to about five feet, in still further embodiments, is less than or equal to about two feet, and in even further embodiments, is less than or equal to about one foot.

In some embodiments, the acceleration and deceleration of either or both of the paving machine 100 or material supply machine 102 is controlled such that at the moment of, or generally at the moment of, expected contact between the paving machine and material supply machine, the speeds of the paving machine and material supply machine are generally matched. Again, because it is usually desirable for the paving machine 100 to keep as consistent a speed as possible throughout the paving process, in one embodiment, the acceleration and deceleration of only the material supply machine 102 is controlled to close the distance and match speeds between the paving machine and material supply machine. However, in other embodiments, the acceleration and deceleration of only the paving machine 100 may be controlled or the acceleration and deceleration of both the paving machine and the material supply machine 102 may be controlled.

At step 414, substantially immediately prior to or substantially at the time of contact between the paving machine 100 and material supply machine 102, at least one of the control systems 110, 112 may optionally control the material supply machine to release any brake, if on. Additionally or alternatively, at least one of the control systems 110, 112 may optionally control the material supply machine 102 to switch into neutral gear, thereby permitting paving machine to push the material supply machine while interfacing therewith. Additionally or alternatively, upon contact and/or after contact between the paving machine 100 and material supply machine 102, at least one of the control systems 110, 112 may optionally control the brake(s) of the material supply machine 102 to cause the controlled application or release of braking pressure in order to substantially maintain or assist in maintaining the interface between the paving machine and material supply machine.

Following contact between the paving machine 100 and material supply machine 102, at step 416, the operator of the material supply machine may raise the material supply machine bed 502, as illustrated in FIG. 5, to deliver paving material to the paving machine hopper 104. In other embodiments, at least one of the control systems 110, 112 of the paving machine 100 and material supply machine 102 may automatically control raising and/or lowering of the material supply machine bed 502. Also following contact between the paving machine 100 and material supply machine 102, any other conventional operations of paving machine and material supply machine may be performed.

Figure 6:
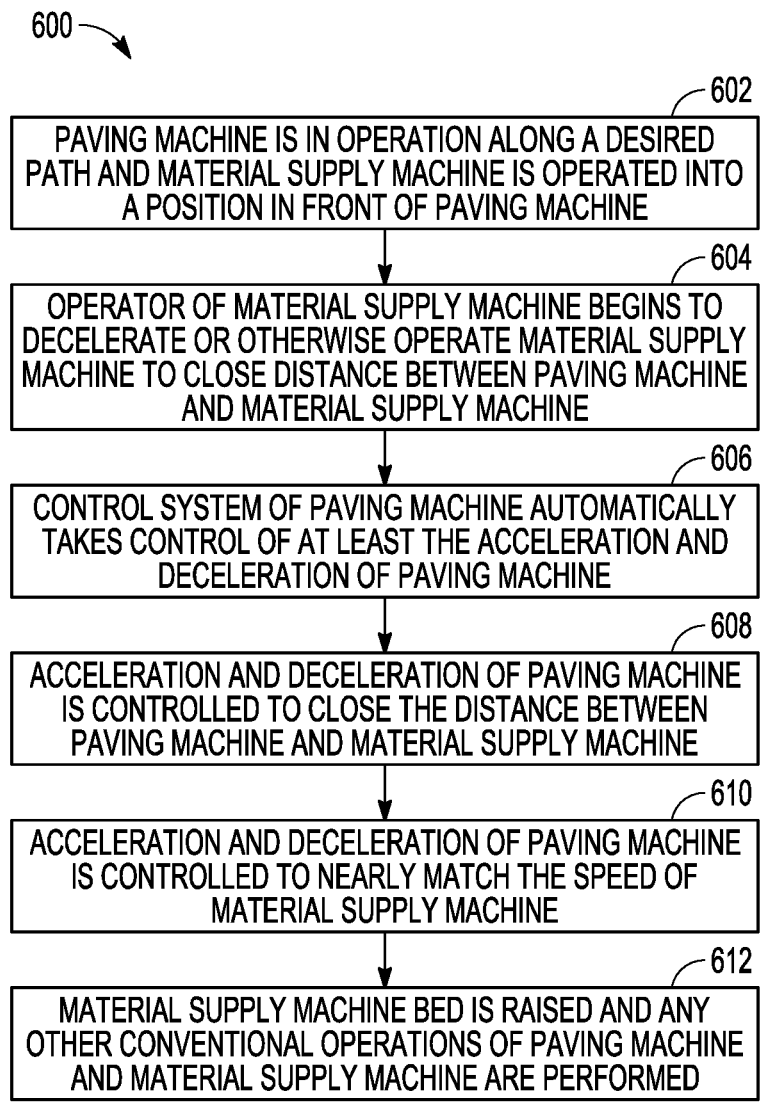
FIG. 6 is a flow diagram for another method for controlling the interface between a paving machine and a material supply machine to reduce deviations or defects in the paved mat in accordance with embodiments of the present disclosure.

While described above, in one embodiment, as a method of using machine-to-machine communication between a paving machine 100 and material supply machine 102, or more particularly, between control systems 110, 112 of the paving machine and material supply machine, other embodiments can operate with a control system on just one of the paving machine or material supply machine. For example, a method 600 of another embodiment for controlling the interface between a paving machine 100 and a material supply machine 102 to reduce deviations or defects in the paved mat is illustrated in FIG. 6. In general, the method 600 of FIG. 6 relates to a process where just the paving machine 100 includes a control system 110 and manages the interface between the paving machine and material supply machine 102 by itself. Pursuant to such method, control systems do not need to be installed on each material supply machine, and the method can operate to reduce deviations or defects in the paved mat, similar to that of method 400, with just a control system installed on the paving machine and without the need for machine-to-machine communication.

Specifically, similar to method 400, in an initial step 602, a paving machine 100 is in operation along a desired path to apply, spread, and compact a mat of material over a desired base, and a material supply machine 102 preparing to supply the paving machine hopper 104 with paving material is operated into a position in front of the paving machine, as illustrated in FIG. 1. Also similar to method 400, at step 604, the operator of the material supply machine 102 begins to decelerate the material supply machine or otherwise operate the material supply machine so as to begin to close the distance between the paving machine 100 and the material supply machine.

At step 606, when the paving machine 100 and material supply machine 102 are determined to be generally within a certain threshold range of one another, such as but not limited to, within ten feet or less, particularly within five feet or less, or even within between about one to three feet or less, a control system 110 of the paving machine 100 automatically takes control of at least the acceleration and deceleration of the paving machine to further close the distance between the paving machine and material supply machine. In one embodiment, whether the paving machine 100 and material supply machine 102 are within a certain threshold range of one another may be determined by control system 110 using data received from sensor(s) 114. Additionally or alternatively, whether the paving machine 100 and material supply machine 102 are within a certain threshold range of one another may be determined by control system 110 using data received from the GPS module 208 of the control system and/or other additional data received, such as from the material supply machine or other source, about the location or position of the material supply machine. In still additional embodiments, other conventional or unconventional methods of automatically determining the distance between two objects may be used in addition to, or as an alternative to, using data from sensor(s) 114 and/or GPS module 208 in order to determine whether the paving machine 100 and material supply machine 102 are within a certain threshold range of one another. In yet another embodiment, rather than the control system 110 taking control of the paving machine 100 automatically when the paving machine and material supply machine 102 are generally within a threshold range of one another, an operator of the paving machine may, at such operator's discretion, manually operate a switch or other mechanical or digital mechanism that switches control of at least the acceleration and deceleration of the paving machine over to the control system 110.

At step 608, under the control of the control system 110, the acceleration and deceleration of the paving machine 100 is controlled to further close the distance between the paving machine and material supply machine 102, Particularly, the relative speed between the paving machine 100 and material supply machine 102 is controlled or managed so as to slowly close the distance between the paving machine and material supply machine.

As indicated previously, the distance between the paving machine 100 and supply machine 102 may refer to the distance between a leading or front end of the paving machine, such as a leading or from end 116 of the hopper 104 or a push bar 118 of the paving machine, and a rear tire or tires 120 of the material supply machine. Of course, in other embodiments, the distance between the paving machine 100 and supply machine 102 may refer to the distance between any suitable part of paving machine and any suitable part of material supply machine.

At step 610, as the distance between the paving machine 100 or material supply machine 102 is determined by the control system 110 to be nearly completely closed, as illustrated in FIG. 5, the acceleration and deceleration of the paving machine is controlled so as to nearly, but not completely, match the speed of the material supply machine, such that the distance between the paving machine and material supply machine is completely closed at a slow pace so that when the paving machine and material supply machine make contact, any impact between the paving machine and material supply machine is reduced, and is generally softer, as compared to conventional methods of interfacing between the paving machine and material supply machine. The speed of the paving machine 100 is nearly matched with the speed of the material supply machine 102 such that the relative speed between the paving machine and material supply machine is, in some embodiments, less than or equal to about three miles per hour, and in other embodiments, less than or equal to about two miles per hour, and in still further embodiments, less than or equal to about one mile per hour. The distance at which the space between the paving machine 100 and material supply machine 102 is considered nearly completely closed may vary depending on the paving operation, but in some embodiments is less than or equal to about five feet, and in other embodiments, is less than or equal to about two feet, and in still further embodiments, is less than or equal to about one foot. Similar to that described above with respect to method 400, in some embodiments, the acceleration and deceleration of the paving machine 100 is controlled such that at the moment of, or generally at the moment of, expected contact between the paving machine and material supply machine 102, the speeds of the paving machine and material supply machine are generally matched.

Following contact between the paving machine 100 and material supply machine 102, at step 612, the operator of the material supply machine may raise the material supply machine bed 502, as illustrated in FIG. 5, to deliver paving material to the paving machine hopper 104. Any other conventional operations of paving machine 100 and material supply machine 102 may also be performed.

In still other embodiments, a control system 110 may be eliminated from the paving machine 100, and instead a material supply machine 102 may include a control system 112 and, optionally, one or more sensors like sensor(s) 114 suitably positioned, such as at the rear of the material supply machine, for sensing/assessing the distance between the material supply machine and a paving machine to which the material supply machine is backing up toward. In such embodiments, a method similar to that of method 600 may be performed but with the control system 112 controlling at least the acceleration and deceleration of the material supply machine 102 during interfacing of the paving machine 100 with the material supply machine as opposed to the control system 110 controlling at least the acceleration and deceleration of the paving machine. In such embodiments, a control system 110 need not be provided with and installed on each paving machine 100 to which the material supply machine will interface, and the method can operate to reduce deviations or defects in the paved mat, similar to that of method 600, with just a control system installed on the material supply machine and without the need for machine-to-machine communication.

In yet other embodiments, any one or more components of control system 110 and/or control system 112 may be located remotely, such as but not limited to, at a remote server or in cloud computing architecture (i.e., the "cloud") 124 operably connected via a network 122, and calculations and operations may be performed remotely by such remote components. Control instructions may, be sent back to the component(s) of the control systems 110, 112 remaining locally on either or both the paving machine 100 and material supply machine 102 in order to control at least the acceleration and deceleration of the paving machine, the material supply machine, or both during the interfacing process as described with respect to methods 400 and 600, for example.

INDUSTRIAL APPLICABILITY

The various embodiments of systems and methods described above may be utilized in a variety of paving applications. As will be appreciated by those of ordinary skill in the art, paving machines are regularly used in the construction of roads, parking lots, and other areas where a smooth durable surface is required for cars, trucks, and other vehicles to travel. In one non-limiting scenario, for example, during a road paving operation, a paving machine generally moves along at a consistent speed laying a paving mat by delivering, via a conveyor system, paving material from a hopper to a screed assembly for discharge onto the roadbed. When the hopper of the paving machine needs to be supplied with additional paving material, a material supply machine, such as a material supply truck, is aligned in front of, and backed up to, the paving machine. The material supply machine is permitted to interface with the paving machine, making contact therewith. Pursuant to the present disclosure, the paving machine, material supply machine, or both may be outfitted with an embodiment of the above-described control system and can operate pursuant to any of the various embodiments of methods 400 and 600 in order to control the interfacing of, and specifically the contact between, the paving machine and material supply machine.

The various systems and methods of the present disclosure reduce or soften any impact between the paving machine and material supply machine during the interfacing process as compared to conventional methods of interfacing. The various systems and methods of the present disclosure do so by sensing or assessing the distance between the paving machine and material supply machine and precisely controlling the speed of one or both of the paving machine and material supply machine to nearly match the speeds of both machines prior to contact, thereby causing minimal impact once contact is achieved. Additionally, the various systems and methods of the present disclosure permit such a reduced or softened impact between the paving machine and material supply machine without the need for expensive dampening devices, such as hydraulic cylinders. Further yet, the various systems and methods of the present disclosure permit additional control between the paving machine and material supply machine, such as control of the brakes of the material supply machine and/or the ability to switch the material supply machine into a neutral gear once contact has been made.

In the foregoing description, various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A system for controlling an interface between a paving machine and material supply machine, the system comprising:
   means for sensing a distance between the paving machine and the material supply machine; and
   a control system in operable communication with the means for sensing and in operable communication with an operational system of the paving machine, an operational system of the material supply machine, or both to take control of at least an acceleration or deceleration of the paving machine, material supply machine, or both;
   wherein the control system controls a relative speed between the paving machine and material supply machine to close the distance between the paving machine and material supply machine at least until an expected contact between the paving machine and material supply machine, the control system controlling the relative speed such that speeds of the paving machine and material supply machine are nearly matched just prior to, and until, at least the expected contact between the paving machine and material supply, machine.

2. The system of claim 1, wherein the means for sensing comprises a sensor mounted to the paving machine.

3. The system of claim 2, wherein the sensor is mounted at or near a leading edge of the paving machine.

4. The system of claim 3, wherein the distance between the paving machine and the material supply machine is a distance between the sensor and a rear tire of the material supply machine.

5. The system of claim 1, wherein the means for sensing comprises a global positioning system module on each of the paving machine and material supply machine.

6. The system of claim 1, wherein the control system comprises a first control system installed on the paving machine and a second control system installed on the material supply machine, and each of the first and second control systems comprise a communications module enabling direct or indirect communication between the first and second control systems.

7. The system of claim 6, wherein the communication between the first and second control systems is via a network connection.

8. The system of claim 6, wherein the communication between the first and second control systems is via a direct wireless communication protocol.

9. The system of claim 6, wherein the control system further comprises a portion remotely located from the first and second control systems and in operational communication with the first and second control systems via a network connection.

10. The system of claim 9, wherein the remotely located portion of the control system receives data from the first control system, the second control system, or both, and sends instructions back to the first control system, the second control system, or both, for controlling the speeds of the first control system, the second control system, or both.

11. A system for controlling an interface between a paving machine and material supply machine, the system comprising:
   a sensor mounted on the paving machine and configured to sense a distance between the paving machine and the material supply machine; and
   a control system installed on the paving machine and in operable communication with the sensor, the control system configured to control at least an acceleration or deceleration of the paving machine;

wherein the control system controls a speed of the paving machine to close the distance between the paving machine and material supply machine at least until an expected contact between the paving machine and material supply machine, the control system controlling the speed of the paving machine such that the speed of the paving machine nearly matches the speed of the material supply machine just prior to, and until, at least the expected contact between the paving machine and material supply machine.

12. The system of claim 11, wherein the sensor is an optical sensor.

13. The system of claim 12, wherein the sensor is mounted at or near a leading edge of the paving machine.

14. The system of claim 12, wherein the distance between the paving machine and the material supply machine is a distance between the sensor and a rear tire of the material supply machine.

15. A method for controlling an interface between a paving machine and material supply machine, the method comprising:

assessing a distance between the paving machine and the material supply machine;

with a control system in operable communication with an operational system of the paving machine, an operational system of the material supply machine, or both, and configured to receive data relating to the assessed distance, controlling an acceleration or deceleration of the paving machine, material supply machine, or both based on the assessed distance; and as the distance between the paving machine and material supply machine is nearly closed, controlling the acceleration or deceleration of the paving machine, material supply machine, or both with the control system at least until an expected contact between the paving machine and material supply machine make contact such that speeds of the paving machine and material supply machine are nearly matched just prior to, and until, at least the expected contact between the paving machine and material supply machine.

16. The method of claim 15, wherein the distance between the paving machine and material supply machine is nearly closed when the distance between the paving machine and material supply machine is less than or equal to about twenty feet.

17. The method of claim 16, wherein the speeds of the paving machine and material supply machine are nearly matched when the relative speed between the paving machine and material supply machine is less than or equal to about one mile per hour.

18. The method of claim 15, wherein the control system comprises a first control system installed on the paving machine and a second control system installed on the material supply machine, and each of the first and second control systems comprise a communications module enabling direct or indirect communication between the first and second control systems, and the method further comprises a step of automatically establishing communication between the first and second control systems when the paving machine and material supply machine are within a first threshold range of one another.

19. The method of claim 18, further comprising automatically taking control of the acceleration or deceleration of the paving machine, material supply machine, or both with the control system when the assessed distance is determined to be within a second threshold range.

20. The method of claim 15, further comprising, substantially immediately prior to contact between the paving machine and material supply machine or upon contact between the paving machine and material supply machine, controlling the material supply machine to release a brake, switch into neutral gear, or both.

* * * * *